Nov. 21, 1967     L. S. JAWORSKI     3,353,436

SHEET METAL SCREW-RECEIVING FASTENER

Filed Dec. 10, 1965

INVENTOR.
LEONARD S. JAWORSKI
BY
Fraser & Fraser
ATTORNEYS

United States Patent Office 3,353,436
Patented Nov. 21, 1967

3,353,436
SHEET METAL SCREW-RECEIVING FASTENER
Leonard S. Jaworski, Toledo, Ohio, assignor to The Bishop and Babcock Corporation, Toledo, Ohio, a corporation of Ohio
Filed Dec. 10, 1965, Ser. No. 513,021
1 Claim. (Cl. 85—32)

This invention relates to screw-receiving fasteners of sheet material and methods of making same.

An object is to produce a screw-receiving fastener formed from sheet metal by pressing, slitting and shaping same and having a layer of non-metallic plastic so intimately associated therewth as to effect a liquid tight seal with a screw applied thereto.

Another object is to produce a simple and efficient method of making a screw-receiving fastener of this character.

Other objects and advantages of the invention will hereinafter appear and for purposes of illustration but not of limitation an embodiment of the invention is shown in the accompanying drawings, in which FIGURE 1 is a side elevation of a sheet metal piece to which is bonded a layer of non-metallic plastic and showing diagrammatically associated therewith a pair of dies for forming a screw-receiving fastener with the male die intended for initial penetration of the plastic layer;

Figures 1, 2:
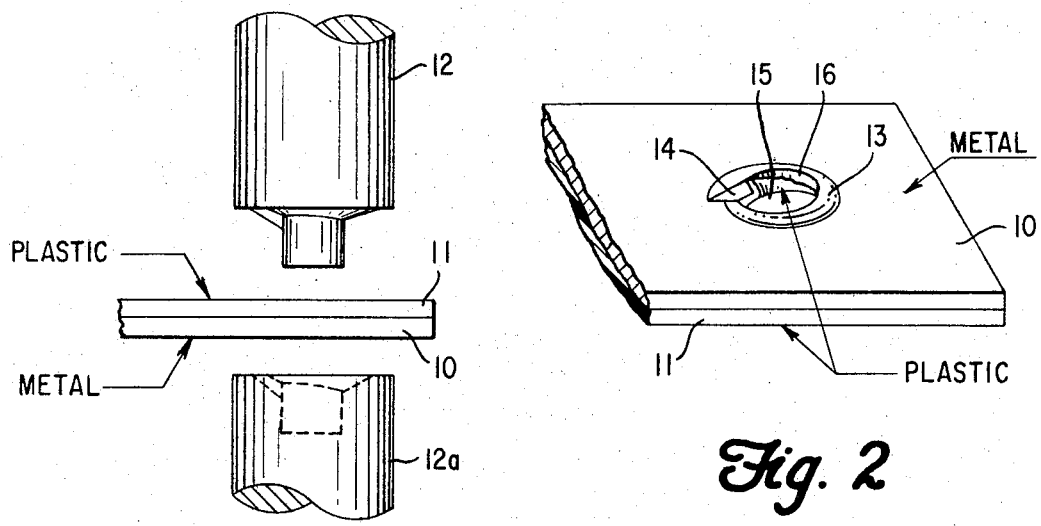
FIGURE 2 is a top perspective view of the screw-receiving fastener viewed from the sheet metal side and showing the manner in which the plastic layer has been forced inside the protuberance and in the region of the helical thread.

The illustrated embodiment of the invention comprises a sheet metal piece 10 to which is adhered in any suitable manner a layer 11 of non-metallic plastic maetrial. The layer 11 must have characteristics of flexibility and resilience and be moisture resistant. A suitable plastic for this purpose is vinyl or polyethylene and it should have appreciable thickness and not merely be a thin coating. Although considerable variation in thickness may be had, it should be in excess of one-half the thickness of the sheet metal piece and may indeed be considerably greater than the sheet metal thickness. The adhesion between the plastic and metal should be of sufficient tenacity that the metal can be shaped into various fastener forms, such as U and J forms, without destroying the bond. However, the adhesion should not be such that in the formation of the screw-receiving impression, a portion cannot be broken away so as to effect a moisture-tight seal as will hereinafter be pointed out.

A pair of dies 12 and 12a is illustraed with the punch or male die shown in position intially to engage the plastic layer 11. In this instance a single pair of dies is shown to accomplish pressing a portion of the metal to form a protuberance 13, slitting the metal radially as at 14, punching to form a central hole 15 and shaping the edge of the hole from one side of the slit to the other to form a helix, as at 16, for screw thread engagement. These steps may be accomplished in a single step or progressively in a series of steps but since this is old in the art, further description is not considered necessary. Reference as to the method of making the impression is made to the following United States patents for illustrative purposes: 2,169,056, Aug. 8, 1939, B. C. Place; 2,366,114, Dec. 26, 1944, H. W. Kost; 2,383,133, Aug. 21, 1945, H. W. Kost.

Figure 1A:
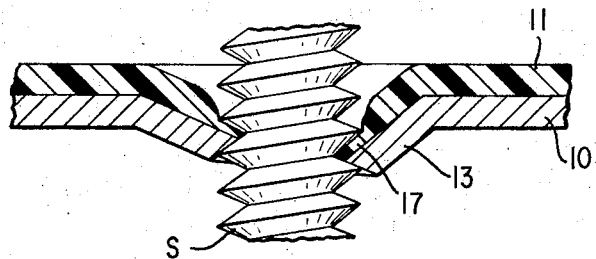
FIGURE 1A is an enlarged sectional view of the fastener with a screw applied thereto and showing the sealing engagement between the plastic layer and the screw threads.
Figure 3:
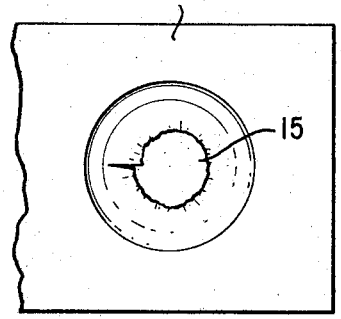
FIGURE 3 is a bottom plan view of the fastener.

With respect to this invention, it is important that the male die first engage the plastic layer 11 before the metal sheet. Thus when the nut impression is formed, the plastic material in that region is punched along with the metal to afford registering screw-receiving holes and radial slits. When the metal is pressed outwardly to form the protuberance 13, it appears that at the high side of the helix 16, the adhesion between the plastic and metal is unimpaired. However such adhesion does not prevail throughout the impression because from the high side of the helix down to the low side of the helix close to the hole edge, the plastic is freed of its bond to the metal 10. Likewise a certain thinning or stretching of the plastic takes place in the region adjacent the hole 15, as indicated at 17 on FIGURE 1A. This is to advantage when a screw S is applied enabling a portion of the plastic including the thinned edge portion 17 to become completely interposed between the threads of the screw and the helix 16 of the impression and, as the screw is tightened, the plastic material between the threads is compressed or deformed. This creates a moisture-tight seal between the screw S and the nut impression and militates against the passage of water from one side of the panel to the other side. Upon removal of the screw S from the nut impression, the resilience of the plastic is such that it will return to its normal condition, thus making possible repeated application of the screw S without loss of the moisture seal.

Numerous changes in details of construction and choice of material may be effected without departing from the spirit of the invention, especially as defined in the appended claim.

What I claim is:

In a screw-receiving impression a sheet metal body having a substantially frusto-conical protuberance provided with a central opening, the rim of which is helical for screw thread engagement and there being a radial slit extending from such opening so that the helix extends from one side of such slit to the opposite side, the improvement which comprises a relatively thin layer of non-metallic flexible and resilient plastic material of a thickness in excess of one half the thickness of the sheet metal adhered to the inner side of said protuberance to cover the helical thread portion and to extend substantially to the edge of said hole, said layer being partially freed of its bond to said protuberance from one end portion of the helix to the other thereby to enable thinning and stretching of the plastic layer to take place in the region of said hole so that a portion of said layer is completely interposed between the threads of an applied screw and the helical rim for insuring a moisture-tight seal with a screw when the latter is tightened.

References Cited

UNITED STATES PATENTS

| 2,417,263 | 3/1947 | Morehouse | 85—36 |
| 2,831,388 | 4/1958 | Collins et al. | 85—32 |
| 2,851,079 | 9/1958 | Heller | 85—32 |
| 2,904,820 | 9/1959 | Flora | 151—7 |

FOREIGN PATENTS 823,368  12/1951  Germany.

EDWARD C. ALLEN, Primary Examiner.

M. PARSONS, Jr., CARL W. TOMLIN, Examiners.